(12) United States Patent
Sadrieh et al.

(10) Patent No.: US 11,294,756 B1
(45) Date of Patent: Apr. 5, 2022

(54) ANOMALY DETECTION IN A NETWORK

(71) Applicant: Amazon Technologies, Inc., Seattle, WA (US)

(72) Inventors: Seyed Arash Sadrieh, Horsley (AU); Joan Enric Barcelo Llado, Zegland (AU)

(73) Assignee: Amazon Technologies, Inc., Seattle, WA (US)

( * ) Notice: Subject to any disclaimer, the term of this patent is extended or adjusted under 35 U.S.C. 154(b) by 18 days.

(21) Appl. No.: 16/575,986

(22) Filed: Sep. 19, 2019

(51) Int. Cl.
*G06F 11/00* (2006.01)
*G06F 11/07* (2006.01)
*G06N 3/04* (2006.01)

(52) U.S. Cl.
CPC ........ *G06F 11/079* (2013.01); *G06F 11/0709* (2013.01); *G06F 11/0751* (2013.01); *G06N 3/0445* (2013.01)

(58) Field of Classification Search
CPC ............. G06F 11/0709; G06F 11/0751; G06F 11/076; G06F 11/079; G06F 11/3447
See application file for complete search history.

(56) References Cited

U.S. PATENT DOCUMENTS

| | | | | |
|---|---|---|---|---|
| 10,045,218 | B1 * | 8/2018 | Stapleton | G06N 7/005 |
| 10,127,125 | B2 * | 11/2018 | Krishnan | G06F 11/0751 |
| 10,410,113 | B2 * | 9/2019 | Clayton | G06N 3/0445 |
| 10,902,062 | B1 * | 1/2021 | Guha | G06F 17/10 |
| 2008/0130645 | A1 * | 6/2008 | Deshpande | H04L 45/28 370/392 |
| 2017/0206464 | A1 * | 7/2017 | Clayton | G06N 3/0445 |
| 2019/0132343 | A1 * | 5/2019 | Chen | G06K 9/6259 |
| 2019/0164287 | A1 * | 5/2019 | Gregson | G06K 9/6271 |
| 2019/0286085 | A1 * | 9/2019 | Kawanoue | G06F 11/0751 |
| 2019/0378010 | A1 * | 12/2019 | Morris | G06Q 20/4016 |
| 2019/0392587 | A1 * | 12/2019 | Nowozin | G06N 7/005 |

* cited by examiner

*Primary Examiner* — Elmira Mehrmanesh
(74) *Attorney, Agent, or Firm* — Klarquist Sparkman, LLP

(57) ABSTRACT

Anomaly detection for one or more streams of time-series data can use an encoder/decoder pair, such as in a variational autoencoder (VAE) in combination with an aggregator or classifier, such as a random isolation forest (RIF). A particular application relates to detecting anomalies in network updates in a large number of network devices that can transmit the updates to a collector for analysis. The encoder/decoder pair can include a neural network with long short-term memory cells or similar type cells. Using the combination, a single anomaly score can be produced from multiple streams of the time-series data.

14 Claims, 7 Drawing Sheets

ANOMALY DETECTION IN A NETWORK

BACKGROUND

The Border Gateway Protocol (BGP) is a standard protocol to exchange reachability information between Autonomous Systems (AS). Ensuring that the BGP communication with external peers is healthy and follows agreed policies ensures stability and security of the network. Abnormal events can be originated by several causes, such as power outages, router misconfigurations, worms, route hijacks and Internet leaks. Abnormal BGP events can affect routing infrastructure and cause delays, data loss and connectivity problems over the Internet. Such anomalies are typically difficult to detect.

DETAILED DESCRIPTION

During a network congestion event, diagnostics of large networks requires a network engineer to manually examine large data sets, which is time consuming and slow. In one example, BGP events can create different types of anomalies (e.g., hijacking of BGP packets, lost BGP packets, etc.) that affect the network in different ways. It is difficult to know how a potential anomaly exhibits itself in traffic statistics, and thus recognizing a potential anomaly is difficult.

Time series events, such as BGP update packets, can be analyzed using artificial intelligence such as a recurrent neural network. An encoder of a recurrent neural network can be used to calculate latent variables, one for each time-sequence input data stream. The latent variables can be used to generate a parameterized latent distribution. A decoder can then be used to generate an output time-series stream with reduced noise. A reconstruction probability can be calculated and an anomaly detection can be computed to obtain a single anomaly score for all of the time series streams or a different anomaly score per stream. In a particular embodiment, a VAE can be used in series with a RIF to calculate the anomaly score or anomaly scores. Thus, it becomes easier to detect potential anomalies using the time series data.

Figure 1:
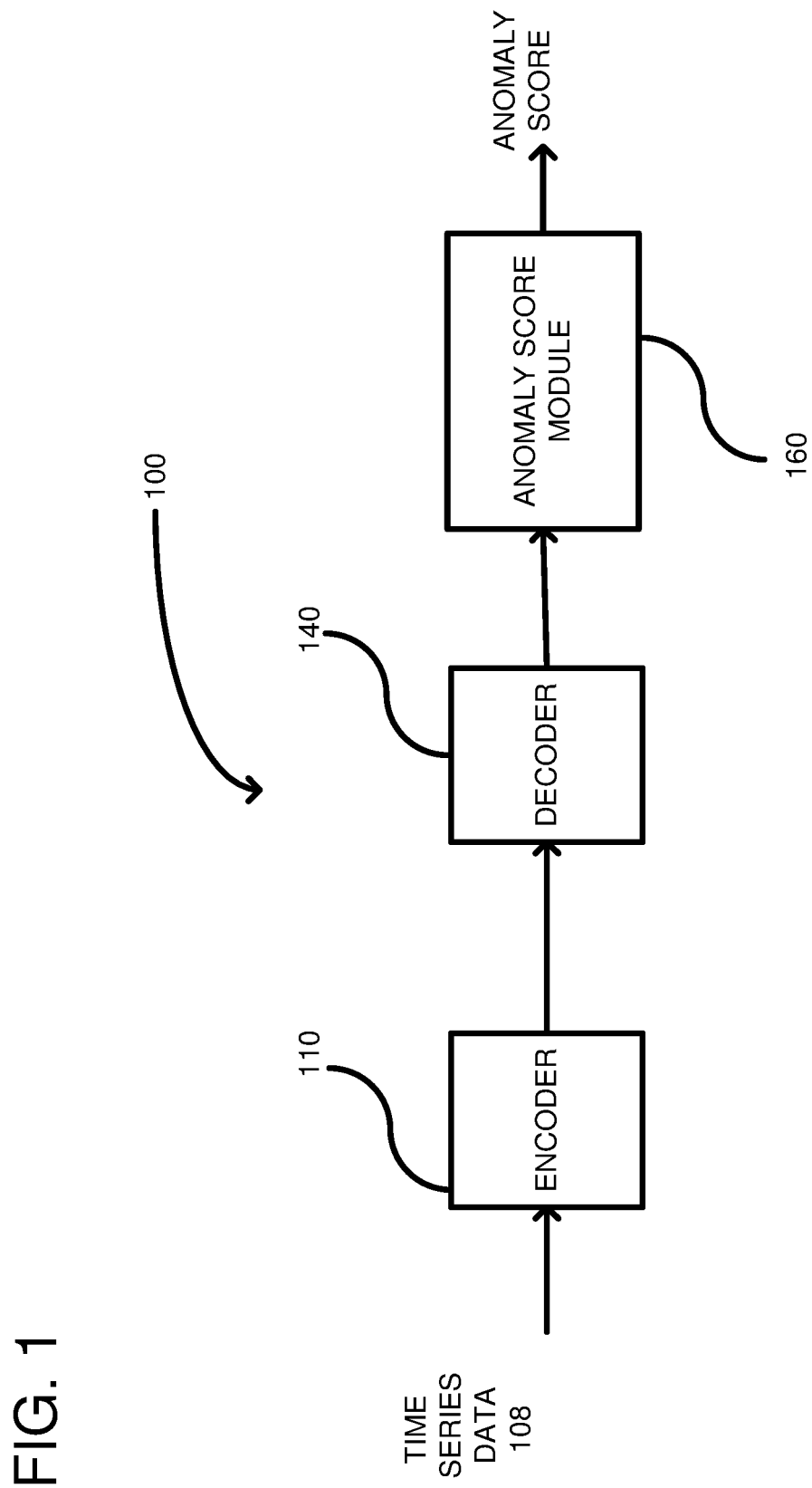
FIG. 1 is an example system according to one embodiment for detecting anomalies in a time series of data.

FIG. 1 is a first embodiment of a system 100 for detecting anomalies. A time series of input data 108 is received. The time series input data can be provided from a number of sources, but represents sequential data based on events that occur in a time order. The time series data can be a single stream, but more typically is multiple streams being delivered in parallel. The time series data can also be a single stream with multiple dimensions. One example of time series input data is BGP updates that occur to network devices. The network can be any type and/or form of network and may include any of the following: a Clos network, a point-to-point network, a broadcast, local area or wide area network, a telecommunications or data communication network, a computer network, an ATM (Asynchronous Transfer Mode) network, a SDH (Synchronous Digital Hierarchy) network, a SONET (Synchronous Optical Network) network, a wireless network and a wired network. The network can also include a wireless link, such as a satellite band or an infrared channel. The topology of the network can be a bus, star, or ring network topology. A network device can include routers, switches, load balancers, firewalls, or other devices used for forwarding packet data. The BGP updates are updates to routing tables of the network devices. Such updates are typically transmitted between network devices in the network. When received, a processor on the network device can transmit a BGP update message to one or more server computers operating as a collector. Thus, the collector can receive thousands of update messages from network devices and the update messages can have a time stamp associated therewith. The collector can then organize the update messages in a time order and transmit the time series data to an encoder 110. As described further below, the encoder can be a neural network or part of a neural network that reduces the time series of input data into latent variables, which are values derived from mathematical functions associated with the encoder 110. As described further below, the encoder 110 can be trained, using past history data, to produce latent variables that more accurately reflect the time series data 108. The encoder 110 outputs the latent variables to a decoder 140 that re-generates the time series data, but with reduced noise and artifacts. As described further below, the decoder 140 can be a neural network that is trained similar to the training of the encoder 110. The output of the decoder 140 is input into an anomaly score module 160, which generates an anomaly score indicating whether there are anomalies in the time series data 108. Typical anomaly scores range from 0-1, wherein 1 indicates a very high probability that an anomaly exists. The anomaly score determination 160 can be a classifier, which produces a single score every pre-determined time period, or an aggregator that generates a continuous output, which is compared to a threshold.

Figure 2:
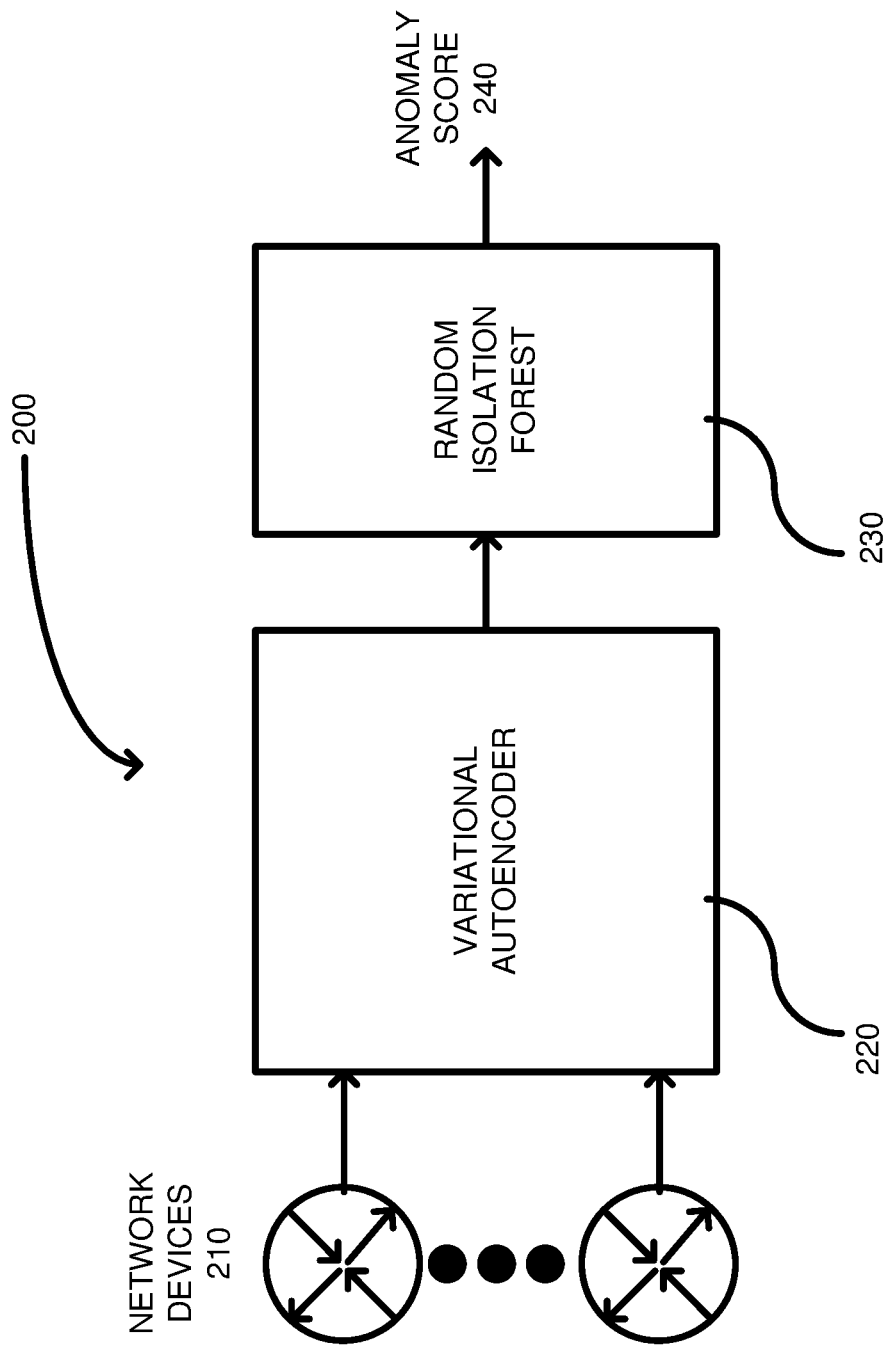
FIG. 2 is a specific example of a system according to another embodiment for detecting anomalies, wherein a variational autoencoder (VAE) is coupled in series with a Random Isolation Forest (RIF) to detect anomalies in messages received from network devices.

FIG. 2 is another embodiment of a system 200 that can be used for detecting anomalies in a network that includes a plurality of network devices 210. The network devices 210 can transmit time series input data to a variational autoencoder (VAE) 220, which can include an encoder-and-decoder pair coupled in series. The VAE provides a probabilistic representation of latent space by using the encoder to describe a probability distribution for each latent attribute. A VAE layer can be trained based on a feature-set representing BGP behavior in the network. The VAE's reconstruction probability for each feature is input into a Random Isolation Forest (RIF) 230 layer in order to calculate the final anomaly score 240 for each observation. The results indicate a synergistic relationship between the VAE layer and RIF layer that produces better or comparable results than VAE and RIF alone. Advantages include an ability to naturally incorporate time-dependent features, online training and high accuracy.

The VAE is a neural network that is trained to copy an input vector $x \in R^N$ to its output $\hat{x} \in R^N$, wherein R is a real number and N relates to the size of the input vector. Typically, the VAE are commonly trained in an unsupervised learning fashion. The VAE includes two parts, an encoder, with function $f(x)=z \in R^M$, and the decoder $g(z)=M$ relates to a size of an output vector produced by the encoder. The vector z denotes the latent variable between the encoder and the decoder. The vector z can be considered an encoded version of x with an encoding factor of M/N<1. The encoder applies dimensionality reduction to the input vector, while the decoder reconstructs the original signal using M-most significant components (wherein M is any integer number of attributes). Measuring the difference between the input vector and its reconstruction can be used as an anomaly score. The main advantage of a VAE over traditional autoencoders is that it provides a probability measure (rather than a deterministic reconstruction error) as an anomaly score. Probabilities are more robust and objective than reconstruction errors. Additionally, probabilities do not require domain-specific knowledge that define the thresholds for determining anomalies.

Figure 3:
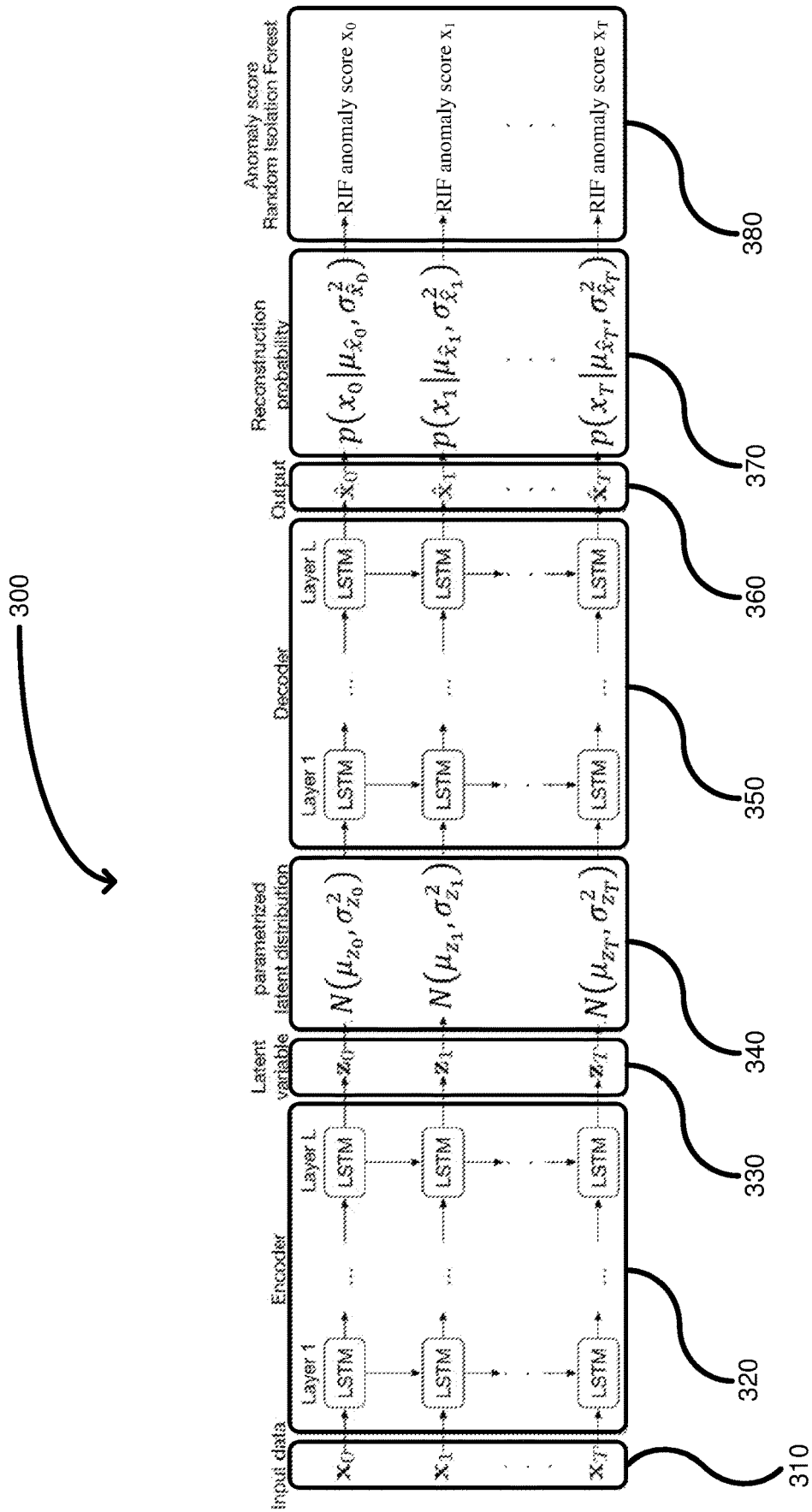
FIG. 3 is an example structure of a system according to another embodiment for detecting anomalies on multiple input data streams.

FIG. 3 shows an example of a VAE-RIF combination 300 according to one embodiment. The input data is shown as a vector $X_0$-$X_T$, wherein T is any integer value. Each X can be an input stream of updates from network devices, such as switches. Other applications of time-series data can also be used. An encoder 320 includes an array of Long-Short Term Memory (LSTM) elements shown as Layer 1 through Layer L, wherein L is any integer number. By using networks with LSTM cells, the temporal nature of the data is taken into account. For example, short and long-term patterns can bring relevant information to an encoder and decoder to extract more accurate features out of the input data. The encoder 320 outputs latent variables $Z_0$-$Z_T$, as shown at 330. The latent variables are used to generate a parameterized latent distribution 340 using a distribution estimation engine (not shown). The probabilistic encoder (which includes encoder 320) parametrizes the distribution of z, using the distribution estimation engine, which can be separate from the encoder or integrated into the encoder, by estimating descriptive statistics of the distribution, such as their mean $\mu_z$, variance $\sigma^2_z$, average, P90, etc. Other parameters can also be estimated in the probability distribution. The parameterized latent distribution 340 is fed into a decoder 350. Both the encoder 320 and decoder 350 of the VAE are implemented using a L-layer LSTM configuration. The probabilistic decoder 350 parametrizes the distribution of $\hat{x} \in Z^N$ by estimating the mean $\mu_{\hat{x}}$ and variance $\sigma^2_{\hat{x}}$. An output $\hat{x}_0$-$\hat{x}_T$, shown at 360, represents the reconstructed input vector 310, but with reduced noise. The output vector 360 is then input into a reconstruction of the probability 370. Finally, the RIF 380 uses the probability determinations 370 to generate an anomaly score for every time sample. In this configuration, $x_t \in Z^N$ denotes the feature vector of dimension N at time t. The training window T is the number of time samples input to the VAE. The compressed latent variable is expressed as $z_t \in Z^M$, where M<N. The reconstruction of x is denoted by $\hat{x} \in Z^N$. The VAE includes the blocks 320, 330, 340, 350 360 and 370.

The RIF 380 uses the reconstruction probability for every feature, i.e., p x|µ$\hat{x}$, σ2$\hat{x}$, as input data. Furthermore, the RIF isolates anomalies rather than creating profiles for normal observations. In particular, an ensemble of decision trees can be built for a given data set. Abnormal instances, which have short average path lengths on the trees, are classified as anomalies. Anomalies are isolated closer to the base of the tree. Some variations of the RIF exist. Random Cut Forest (RCF) for stream data can also be used.

In a particular embodiment, the VAE can be implemented by stacking two layers of LSTM cells of N=12 dimension size. The latent variable is M=3, giving a compression rate of 0.25. The number of trees used can be 100. In order to train the VAE-RIF, the VAE and the RIF layers have been trained sequentially. First, the VAE layer can be trained using batches of 512 timestamps. Once converged, a second step trains the RIF. The training data is fit into the VAE to compute the reconstruction probability and then the output is used to train the RIF layer. The numbers chosen are based on the input data and different numbers can be chosen depending on the application.

Figure 4:
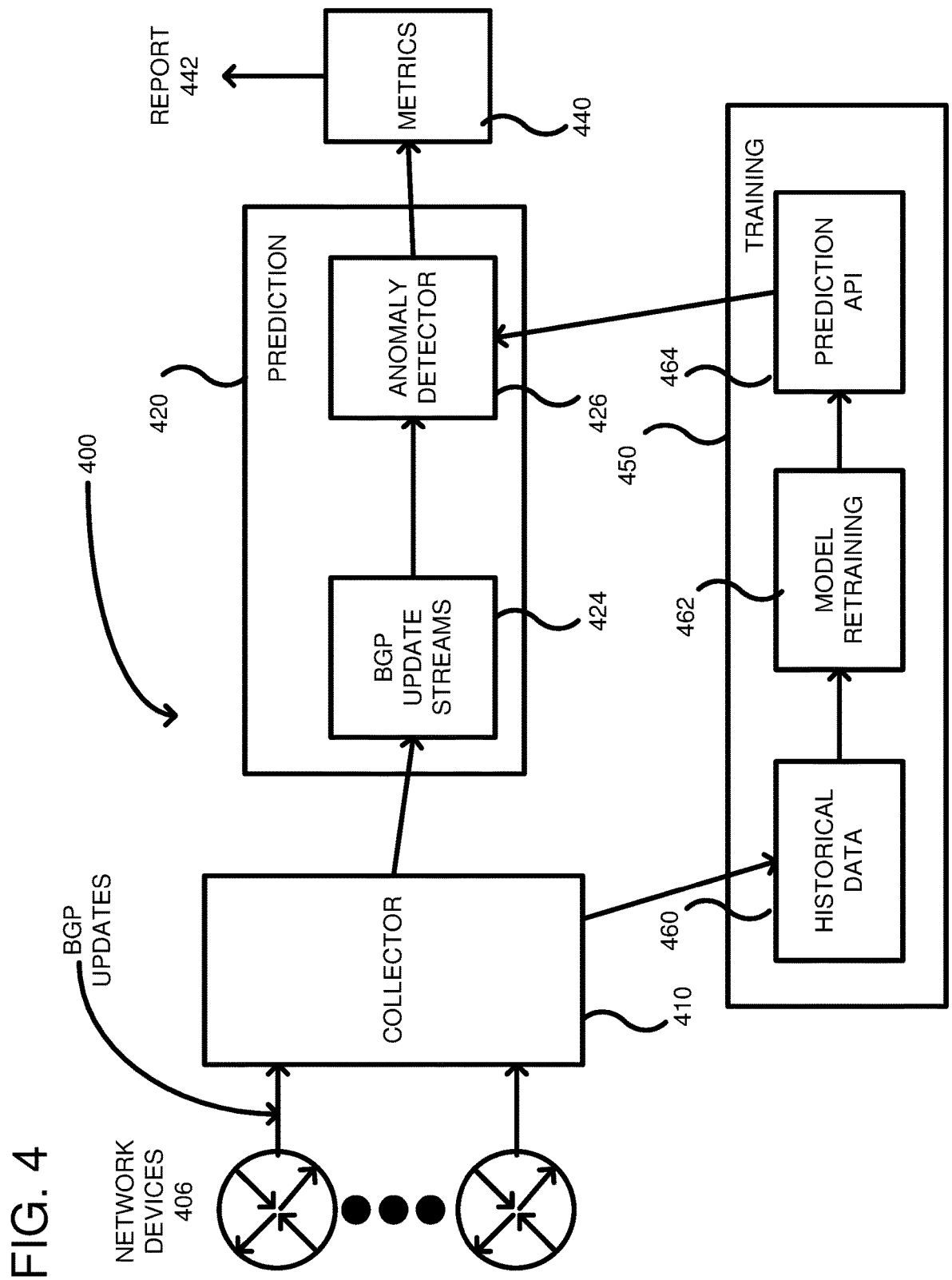
FIG. 4 shows an anomaly detection system according to another embodiment using a prediction module including a neural network and a training module for training the prediction module.
Figure 7:
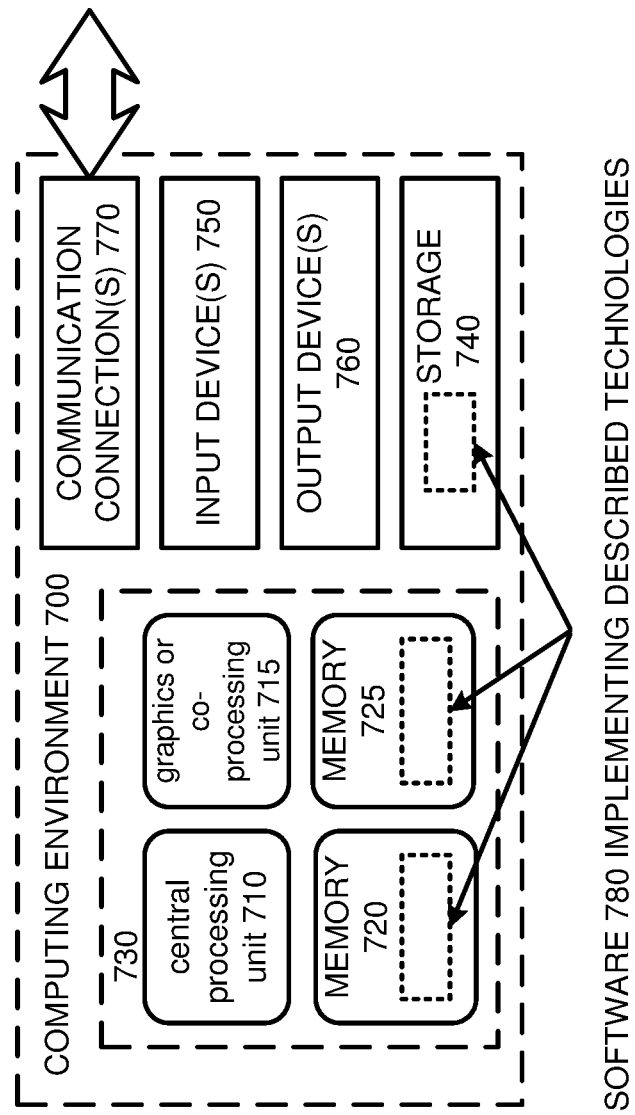
FIG. 7 depicts a generalized example of a suitable computing environment in which the described innovations may be implemented.

FIG. 4 shows another embodiment of a system 400 for BGP anomaly detection. Network devices 406 can be associated with network devices forming one or more data centers and can represent thousands of network devices. The network devices 406 can transmit BGP updates (e.g., from multiple routers) that occur to a collector 410, which can include one or more server computers. The collector 410 can parse the messages and reconstruct a Routing Internet Protocol (RIP) table. A copy of the RIP can be stored periodically. The collector 410 transmits the updates to prediction logic 420, which can include a BGP update streams module 424 and an anomaly detector 426 coupled in series. The prediction logic 420 can be implemented in a server computer, such as is shown in FIG. 7 and further discussed below. The anomaly detector 426 includes an encoder/decoder pair and a classifier and/or aggregator coupled in series. An example includes a VAE coupled in series with a RIF as shown in FIG. 2. The prediction module 420 outputs metrics 440 indicative of whether anomalies occurred in the network devices. The metrics 440 can then be pushed or pulled in a report 442 to a network administrator.

The collector 410 can transmit BGP updates to a training block 450 used to train the anomaly detector 426 including the encoder/decoder pair. The training block 450 can be implemented in a server computer, which is a same server computer as the prediction logic 420 or a different server computer. The training block 450 can include memory for storing historical data 460. The historical data can include BGP updates or other information from the network devices 406. A model retraining module 462 can be used to update weights supplied to the anomaly detector 426. For example, updated weighting information can be provided to the LSTMs of FIG. 3. The weighting information can change the LSTM calculation of the latent variables 330. A prediction API 464 can transmit the weighting information to the anomaly detector 426 for modifying the weights in the neural network. Thus, the neural network can be trained based on previous BGP updates to detect anomalies.

Figure 5:
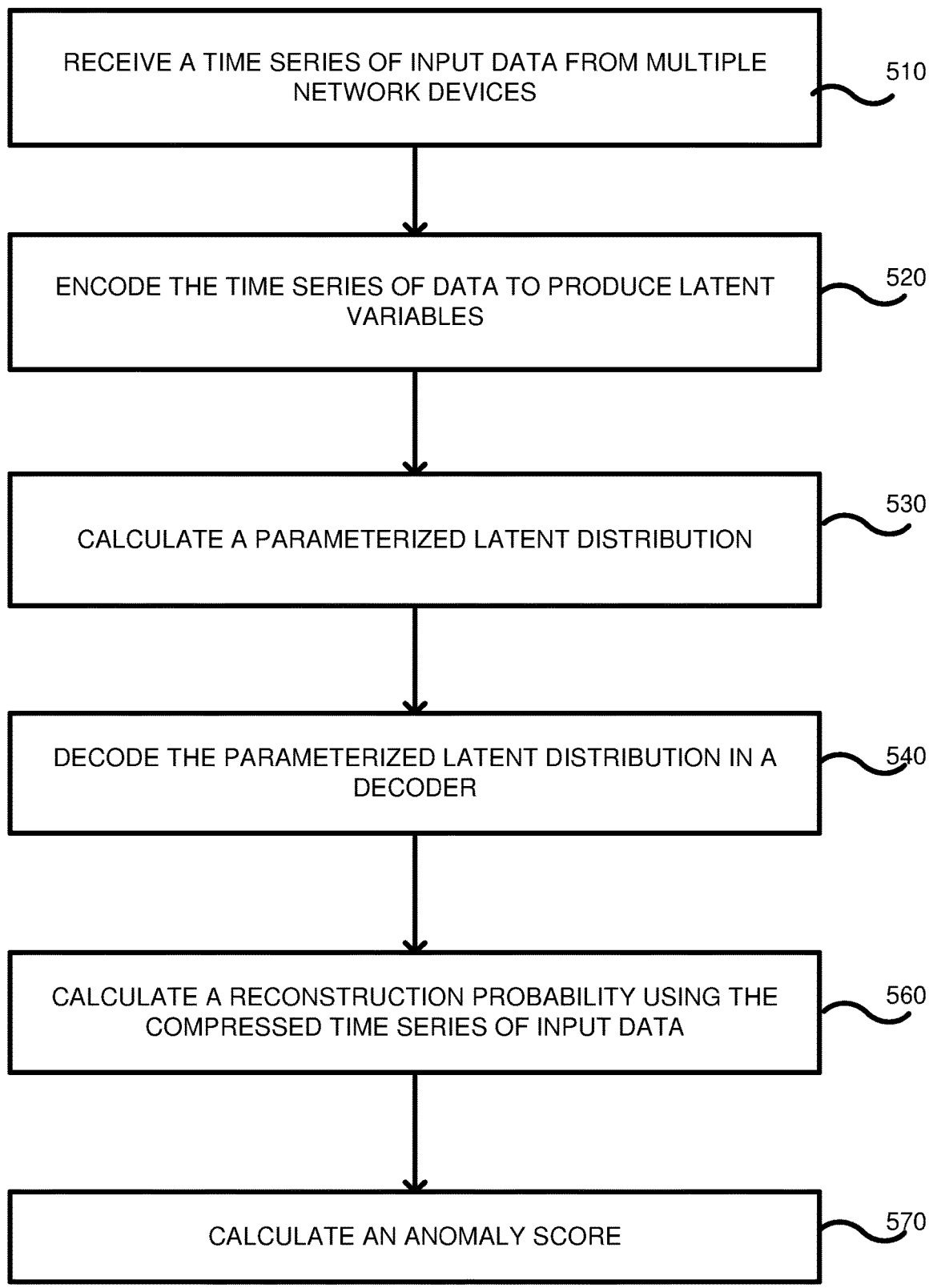
FIG. 5 is a flowchart according to one embodiment for detecting anomalies of one or more streams of time series data.

FIG. 5 is a flowchart according to one embodiment for anomaly detection in a network. In process block 510, a time series of input data is received from multiple network devices. For example, in FIG. 1, a time series of data 108 is received in an encoder 110 from multiple network devices, such as routers in a data center. The receipt of the time series of data can also be seen, as another example, in FIG. 4 at 424, wherein such data is received within the prediction module 420 from the collector 410. In process block 520, the time series of data can be encoded to produce latent variables. For example, returning to FIG. 1, the time series of data can be encoded by encoder 110 to produce latent variables. The latent variables represent a compression of the time series of data, and such a compression can be performed by a neural network within the encoder. Example neural networks can be formed by an array of LSTM cells, such as is shown in FIG. 3. Other cell types can be used in a neural network, such as Recurrent Neural Networks (RNN) or Gated Recurrent Units (GRU). In process block 530, a parameterized latent distribution is calculated. For example, in FIG. 3, the parameterized distribution of latent variables 340 provides two vectors describing the mean and the variance of the latent state distributions.

In process block 540, the parameterized latent distribution is decoded in a decoder, such as is shown by the decoder 140 in FIG. 1. The decoder generates a latent vector by sampling the latent state distributions to develop a reconstruction of the original input. The decoder 350 can also include an array of LSTM cells, or similar cell types used by the encoder. Both the encoder 320 and the decoder 350 can be trained using backpropagation, reparameterization and other known techniques for training neural networks. In process block 560, a reconstruction probability can be calculated using latent variables output from the decoder. For example, in FIG. 3, the parameterized distribution 370 of the reconstructed variables can calculated. As shown in FIG. 3, at 370, the reconstructed probability can include a mean and a variance. In process block 570, an anomaly score can be calculated. Different aggregators or classifiers can be used to calculate the anomaly score, such as a RIF 380 (FIG. 3). Accordingly, a different anomaly score can be determined for each input stream $X_T$ or a single anomaly score can be determined, which is representative of an anomaly in any of the input streams.

Figure 6:
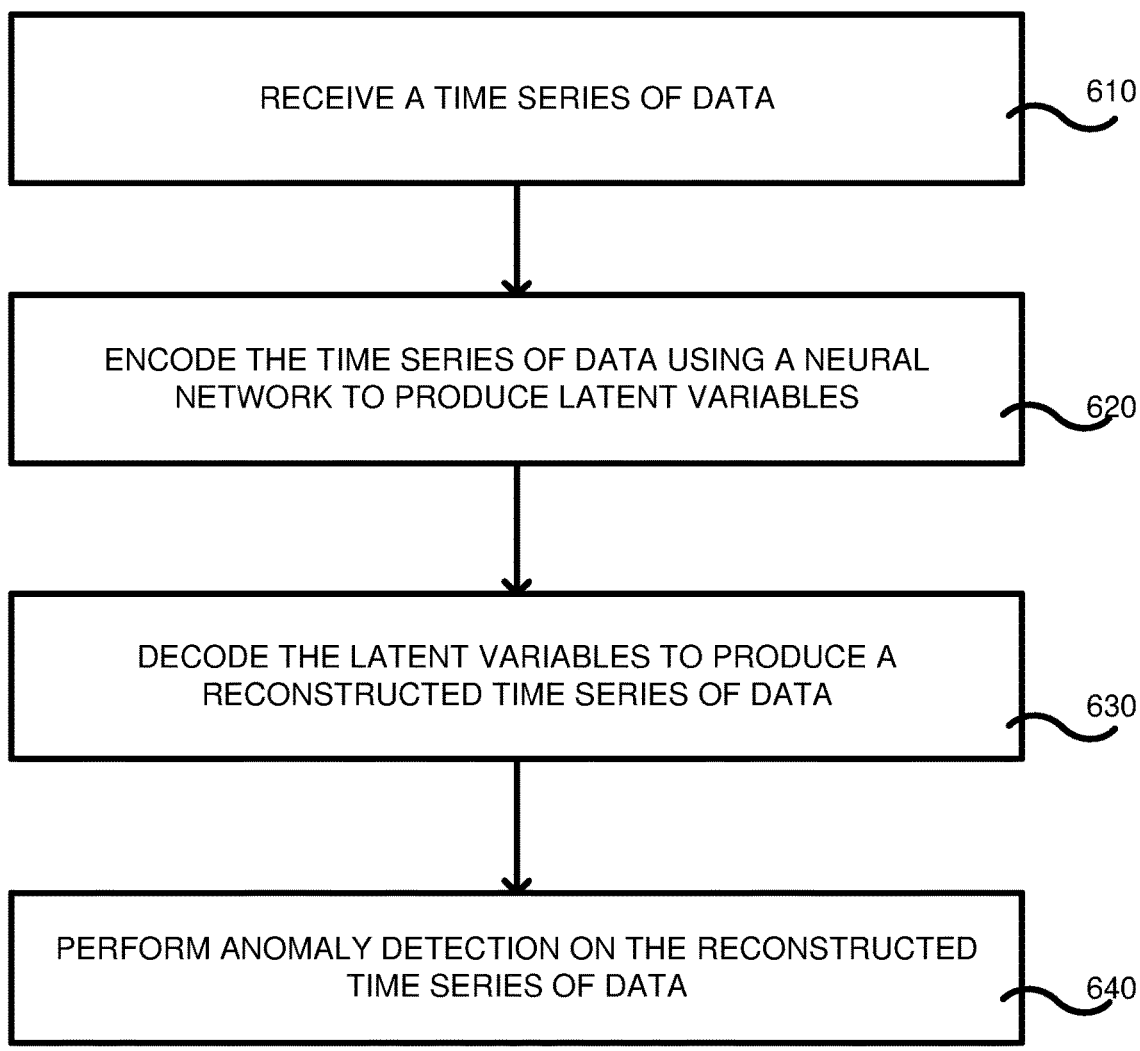
FIG. 6 is a flowchart according to another embodiment for detecting anomalies of one or more streams of time series data.

FIG. 6 is a flowchart according to another embodiment for detecting anomalies in time series input data. In process block 610, a time series of data is received. The time series data can be reordered in accordance with time stamps to ensure it is in chronological order. The time series data can be a sequence of successive equally-spaced time points, or can be randomly spaced. The time series data can be related to updates from network devices, such as BGP updates of router tables. However, the time series data can be to data unrelated to network devices or could pertain to network devices more generally. In process block 620, the time series of data can be encoded using a neural network to produce latent variables. For example, FIG. 3 shows an encoder 320 that can be used including LSTM cell types. Other cell types can be used including later developed cell types. The result of the encoder is to generate latent variables that represent a compression of the time series data. For example, FIG. 3 at 330 shows latent variables $Z_T$ that are a compression to the input data 310. In process block 630, the latent variables can be decoded to produce a reconstructed time series of data. For example, in FIG. 3, the decoder 350 can be a neural network with similar cells as the encoder 320. The decoder can generate a reconstructed time series 360. In process block 640, anomaly detection can then be performed on the resultant output of the decoder. For example, in FIG. 3, a RIF 380 can be used to generate an anomaly score. A mean and variance of the decoder output 360 can be used as an input to the RIF. The anomaly scores can be analyzed to determine whether they exceed a threshold and alerts can be generated for any detected anomalies.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.). The computing environment can be used, for example, to implement the encoder/decoder and/or any other software or hardware described herein.

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of detecting anomalies in a network, the method comprising:
   in a collector server computer, receiving a time series of input data from multiple network devices in the network;
   encoding the time series of input data in an encoder to produce latent variables associated with the time series of input data;
   calculating a parameterized latent distribution of the latent variables;
   decoding the parameterized latent distribution in a decoder to produce a decompressed time series of the input data;
   calculating a reconstruction probability using the decompressed time series of input data; and
   using the reconstruction probability, calculating an anomaly score indicative of anomalies in the network, wherein the anomaly score is calculated using a Random Isolation Forest (RIF) algorithm;
   wherein the encoder and decoder form a variational autoencoder (VAE);
   wherein the network devices are network switches and the time series of input data includes Border Gateway Protocol (BGP) updates to the network switches; and
   the method further comprises training the decoder and the encoder using weights calculated using the BGP updates.

2. The method of claim 1, wherein the encoder is within a recurrent neural network.

3. The method of claim 2, wherein the encoder includes a network of long short-term memory (LSTM) cells.

4. A method, comprising:
   receiving, from network switches, a time series of data in a collector server computer, wherein the time series of data includes Border Gateway Protocol (BGP) updates to the network switches;
   encoding the time series of data using an encoder in a neural network to produce latent variables;
   decoding the latent variables in a decoder in the neural network to produce a reconstructed time series of the data;
   performing anomaly detection on the reconstructed time series of the data, wherein the encoding and the decoding are performed in a Variational Autoencoder (VAE) and the anomaly detection is performed with a Random Isolation Forest (RIF) algorithm in series with the VAE;
   training the decoder and the encoder using weights calculated using the BGP updates.

5. The method of claim 4, further including calculating a descriptive statistical function of the latent variables and using a mean and a variance calculation as input to a decoder performing the decoding.

6. The method of claim 4, wherein performing the anomaly detection results in a single score for each point in time and the method further including comparing the single score to a threshold to determine if there are anomalies at each point in time.

7. The method of claim 4, wherein the encoding and decoding occur in a recurrent neural network.

8. The method of claim 4, further including using the reconstructed time series of data to calculate a probability distribution.

9. The method of claim 4, wherein the encoding occurs using an encoder comprising a network of long short-term memory (LSTM) cells.

10. A system for detecting anomalies, comprising:
an encoder for encoding a plurality of time series input streams to produce a set of latent variables, wherein the time series of input streams are generated by network devices and the time series of input streams is Border Gateway Protocol (BGP) updates to the network devices;
a distribution estimation engine coupled to the encoder for determining descriptive statistics of the set of latent variables;
a decoder coupled to the distribution estimation engine for decoding a mean and a variance of the set of latent variables and producing a decoder output;
an anomaly detector coupled to the decoder for receiving the decoder output and for detecting an anomaly in the plurality of the time series input streams, wherein the encoder, the distribution engine and the decoder form a Variational Autoencoder (VAE) and the anomaly detector uses a Random Isolation Forest (RIF) algorithm in series with the VAE; and
a training block coupled to the decoder and encoder, the training block configured to calculate weighting for training the decoder and encoder using the BGP updates.

11. The system of claim 10, wherein the encoder includes a network of long short-term memory (LSTM) blocks.

12. The system of claim 10, wherein the anomaly detector includes an aggregator or a classifier.

13. The system of claim 10, wherein the encoder and decoder are neural networks with training inputs.

14. One or more computer-readable media comprising computer-executable instructions that, when executed, cause a computing system to perform a method comprising:
in a collector server computer, receiving a time series of input data from multiple network devices in the network;
encoding the time series of input data in an encoder to produce latent variables associated with the time series of input data;
calculating a parameterized latent distribution of the latent variables;
decoding the parameterized latent distribution in a decoder to produce a decompressed time series of the input data;
calculating a reconstruction probability using the decompressed time series of input data; and
using the reconstruction probability, calculating an anomaly score indicative of anomalies in the network, wherein the anomaly score is calculated using a Random Isolation Forest (RIF) algorithm;
wherein the encoder and decoder form a variational autoencoder (VAE);
wherein the network devices are network switches and the time series of input data includes Border Gateway Protocol (BGP) updates to the network switches; and
the method further comprises training the decoder and the encoder using weights calculated using the BGP updates.

* * * * *